(12) United States Patent
Resuta et al.

(10) Patent No.: US 9,807,434 B2
(45) Date of Patent: Oct. 31, 2017

(54) DYNAMIC BANDWIDTH ALLOCATION FOR NON-REAL TIME OPERATIONS

(71) Applicant: ARRIS Enterprises, Inc., Suwanee, GA (US)

(72) Inventors: David P. Resuta, Chalfont, PA (US); Mark F. Engle, Jamison, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 31 days.

(21) Appl. No.: 14/854,729

(22) Filed: Sep. 15, 2015

(65) Prior Publication Data
US 2017/0078712 A1  Mar. 16, 2017

(51) Int. Cl.
H04N 7/173 (2011.01)
H04N 21/2385 (2011.01)
H04N 21/2662 (2011.01)
H04N 21/2187 (2011.01)
H04N 21/24 (2011.01)

(52) U.S. Cl.
CPC ..... *H04N 21/2385* (2013.01); *H04N 21/2187* (2013.01); *H04N 21/2402* (2013.01); *H04N 21/2662* (2013.01)

(58) Field of Classification Search
CPC .................................................. H04N 21/2402
See application file for complete search history.

(56) References Cited

U.S. PATENT DOCUMENTS

| | | | | |
|---|---|---|---|---|
| 8,224,341 B2 * | 7/2012 | Lee | ........................ | H04W 72/10 455/450 |
| 2001/0043613 A1 * | 11/2001 | Wibowo | ............... | H04J 3/1682 370/468 |
| 2003/0003921 A1 * | 1/2003 | Laakso | ............... | H04W 52/343 455/453 |

FOREIGN PATENT DOCUMENTS

KR   WO 2006068411 A1 *  6/2006   ........... H04L 47/828

* cited by examiner

*Primary Examiner* — Gigi L Dubasky
(74) *Attorney, Agent, or Firm* — Bart A. Perkins

(57) ABSTRACT

Methods, systems, and computer readable media can be operable to facilitate dynamic bandwidth allocation for non-real time operations. The processing of real time operations may be prioritized over the processing of non-real time operations by reducing the amount of device resources and bandwidth that are allocated to non-real time operations. A maximum bandwidth for non-real time operations may be determined and dynamically adjusted, wherein the maximum bandwidth is based upon the bandwidth available to a device that is not being used for the processing of real time operations. Bitrates at which non-real time operations are processed may be dynamically adjusted such that the maximum bandwidth is not exceeded by the processing of the non-real time operations.

17 Claims, 5 Drawing Sheets

DYNAMIC BANDWIDTH ALLOCATION FOR NON-REAL TIME OPERATIONS

TECHNICAL FIELD

This disclosure relates to bitrate adjustment of non-real time operations.

BACKGROUND

Customer premise equipment (CPE) devices such as gateway devices and set-top boxes (STB) are typically installed at a customer premise so that a subscriber may receive multimedia services offered by a multiple systems operator (MSO). CPE devices face increasing resource demands due to the need to support many real time and non-real time operations such as local recordings, local playback, streaming sessions and media copy and transcoding operations. For example, a STB can be used by the subscriber to access a variety of multimedia services, including but not limited to live or linear television, digital video recorder (DVR) content, video-on-demand (VoD) content, over-the-top (OTT) content, and others.

Non-real time operations such as media copy and transcoding operations do not require real time processing or delivery and are only constrained by network bandwidth, yet the processing of non-real time operations at a high bitrate may create a shortage of device or network resources and may cause degradation to the processing of real time operations. There is a need for non-real time operations to be processed at optimal transfer speeds to create a better user experience, but a balance is desired so that the processing of non-real time operations does not interfere with the processing of real time operations at a CPE device. Therefore, it is desirable to improve upon methods and systems for allocating device resources and bandwidth between real time and non-real time operations.

BRIEF DESCRIPTION OF THE DRAWINGS

Like reference numbers and designations in the various drawings indicate like elements.

DETAILED DESCRIPTION

Figure 1:
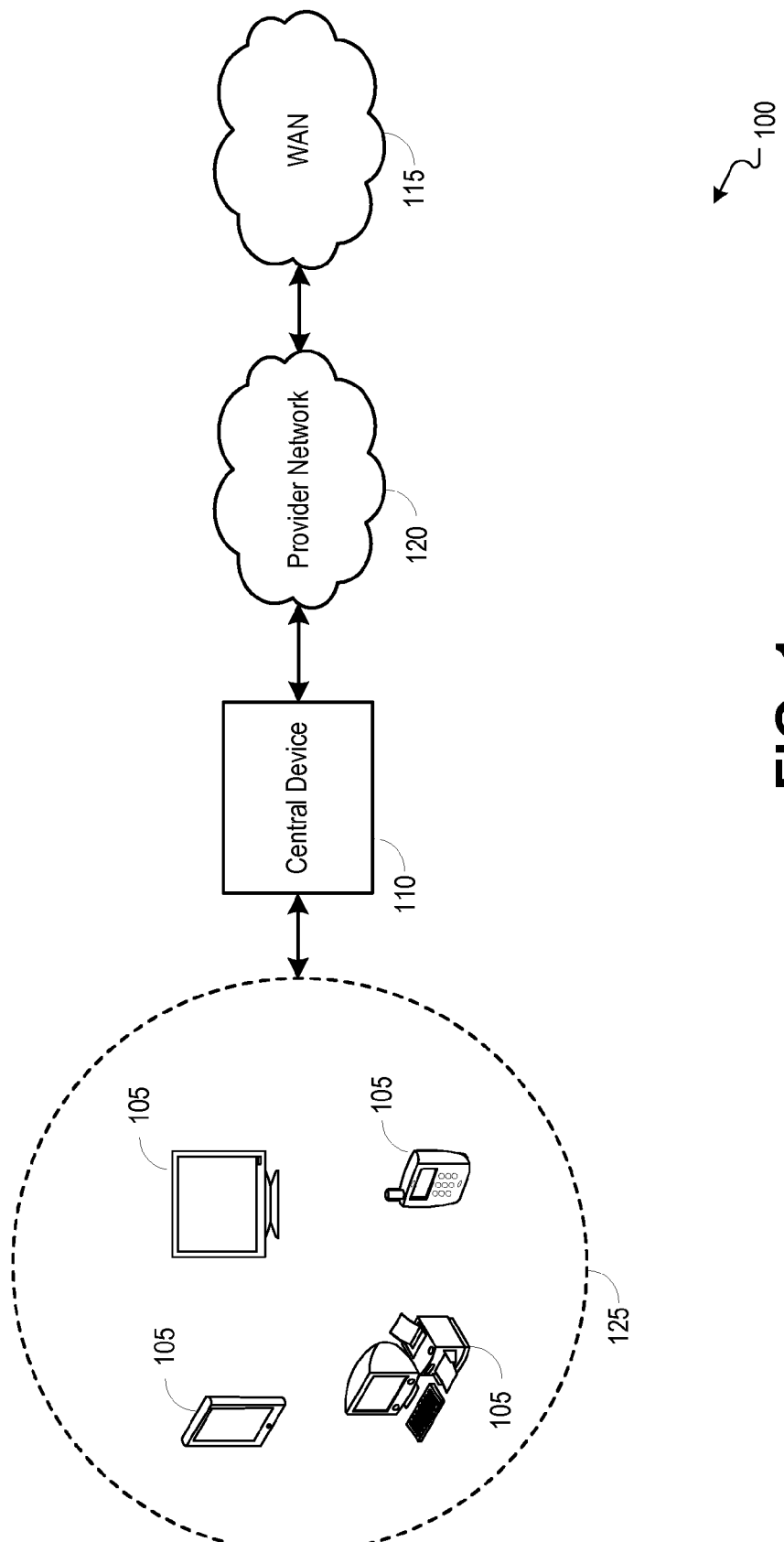
FIG. 1 is a block diagram illustrating an example network environment operable to facilitate dynamic bandwidth allocation for non-real time operations.

It is desirable to improve upon methods and systems for allocating device resources and bandwidth between real time and non-real time operations. Methods, systems, and computer readable media can be operable to facilitate dynamic bandwidth allocation for non-real time operations. The processing of real time operations may be prioritized over the processing of non-real time operations by reducing the amount of device resources and bandwidth that are allocated to non-real time operations. A maximum bandwidth for non-real time operations may be determined and dynamically adjusted, wherein the maximum bandwidth is based upon the bandwidth available to a device that is not being used for the processing of real time operations. Bitrates at which non-real time operations are processed may be dynamically adjusted such that the maximum bandwidth is not exceeded by the processing of the non-real time operations.

Real-time operations may include any operation that is to be completed in furtherance of the processing and/or output of content to a client as the content is received by a central device (e.g., customer premise equipment (CPE) device). For example, real-time operations, as used herein, may include, but are not limited to content output (e.g., output of linear content, DVR content, VoD content, etc.) to a client, media transcoding during playback of the media (e.g., transcoding of a piece of content is occurring in parallel with playback of the content), recording operations, and other operations that might require immediate use of device resources.

Non-real time operations, as used herein, may include any operation that may be completed over an extended period of time, or that is otherwise not bound by a time constraint. For example, non-real time operations may include, but are not limited to media copy operations (e.g., making a copy of content that has been received by a device), background transcoding operations, transcoding of content for later use (e.g., transcoding a piece of content into a format that is compatible with a device that might be used to view the content at a later time), and others. It should be understood that transcoding operations may be either real-time or non-real time operations depending on whether the operation is being completed to facilitate an immediate playback of the associated content.

In embodiments, when requests are received at a device for non-real time operations, an algorithm may use resource constraints associated with the operations currently being processed at the device to determine the maximum bandwidth allowed for all currently active non-real time operations. The bandwidth adjustment may be applied to a transport path supporting the requested non-real time operation. As real time and non-real time operation requests are added to or removed from the operations of the device, bitrates and/or bandwidths may be adjusted for all currently active non-real time operations based on the current resource load of the device, thereby providing the non-real time operations with resources for being optimally processed without interfering with the real time requests. Non-real time operations may be processed at an optimal transfer speed, the optimal transfer speed being the fastest speed at which one or more non-real time operations may be processed using available physical network resources without degrading real-time operations.

Whereas network based algorithms only take into account the throughput of a network to prioritize the different types of streaming (e.g., virtual local area network (VLAN) tagging), the methods, systems, and computer readable media described herein use the resource load on a device (e.g., customer premise equipment (CPE) device) to adjust the amount of video data sent to the network.

An embodiment of the invention described herein may include a method comprising: (a) recognizing a change in a resource load associated with a device; (b) determining a maximum bandwidth allocation for processing non-real time operations, wherein the maximum bandwidth allocation for processing non-real time operations is based upon a maximum bandwidth available to the device and the amount of bandwidth required for real time operations being processed at the device; and (c) managing the processing of one or more non-real time operations such that the processing of the one or more non-real time operations conforms with the maximum bandwidth allocation for processing non-real time operations.

According to an embodiment of the invention, recognizing the change in the resource load associated with the device comprises identifying a request for a real time operation to be processed by the device.

According to an embodiment of the invention, recognizing the change in the resource load associated with the device comprises identifying a request for a non-real time operation to be processed by the device.

According to an embodiment of the invention, determining the maximum bandwidth allocation for processing non-real time operations comprises reducing the maximum bandwidth available to the device by the sum of the amount of bandwidth required by the real time operations being processed at the device, and an amount of bandwidth that is reserved for processing forthcoming real time operations.

According to an embodiment of the invention, the method described above may further comprise: (a) determining a uniform bandwidth allocation for each respective one of the one or more non-real time operations by dividing the maximum bandwidth allocation for processing non-real time operations by the number of non-real time operations being processed at the device; and (b) adjusting the bitrate at which each respective one of the one or more non-real time operations is processed such that the bandwidth consumed by the processing of the respective non-real time operation is less than the uniform bandwidth allocation.

According to an embodiment of the invention, the method described above may further comprise: (a) determining a unique bandwidth allocation for each respective one of the one or more non-real time operations, wherein the unique bandwidth allocated to each respective one of the one or more non-real time operations is based upon a priority level associated with the respective non-real time operation; and (b) adjusting the bitrate at which each respective one of the one or more non-real time operations is processed such that the bandwidth consumed by the processing of the respective non-real time operation is less than the unique bandwidth allocation for the respective non-real time operation.

According to an embodiment of the invention, managing the processing of one or more non-real time operations comprises, adjusting the processing of the one or more non-real time operations such that the bandwidth consumed by the processing of the one or more non-real time operations is reduced by a predetermined amount.

According to an embodiment of the invention, the device comprises a customer premise equipment device.

According to an embodiment of the invention, one or more of the non-real time operations comprise copy operations.

An embodiment of the invention described herein may include an apparatus for processing real time operations and non-real time operations, the apparatus comprising a module configured to: (a) recognize a change in a resource load; (b) determine a maximum bandwidth allocation for processing non-real time operations, wherein the maximum bandwidth allocation for processing non-real time operations is based upon a maximum bandwidth for processing real time operations and non-real time operations and the amount of bandwidth required for real time operations being processed; and (c) adjust the processing of one or more non-real time operations such that the bandwidth consumed by the processing of the one or more non-real time operations is less than the maximum bandwidth allocation for processing non-real time operations.

An embodiment of the invention described herein may include one or more non-transitory computer readable media having instructions operable to cause one or more processors to perform the operations comprising: (a) recognizing a change in a resource load associated with a device; (b) determining a maximum bandwidth allocation for processing non-real time operations, wherein the maximum bandwidth allocation for processing non-real time operations is based upon a maximum bandwidth available to the device and the amount of bandwidth required for real time operations being processed at the device; and (c) adjusting the processing of one or more non-real time operations such that the bandwidth consumed by the processing of the one or more non-real time operations is less than the maximum bandwidth allocation for processing non-real time operations.

FIG. 1 is a block diagram illustrating an example network environment 100 operable to facilitate dynamic bandwidth allocation for non-real time operations. In embodiments, video, voice, and/or data services may be delivered to one or more client devices 105. Client devices 105 may include a television, mobile device, tablet, computer, set-top box (STB), telephone, gaming device, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others. It should be further understood that the devices shown in FIG. 1 may be integrated. For example, a television may be connected to and controlled by a STB.

In embodiments, a central device 110 may receive and provide multiple services (e.g., video, voice, and/or data services) to one or more client devices 105. A central device 110 may include a gateway device, cable modem, STB, and any other device configured to receive and provide one or more of the multiple services to one or more client devices 105. One or more of the multiple services may be delivered from a wide-area network (WAN) 115 to the central device 110 through a connection between the central device 110 and a provider network 120. The provider network 120 may include an optical network, hybrid fiber coaxial (HFC) network, digital subscriber line (DSL) network, twisted-pair, mobile network, high-speed data network, Multimedia over Coax Alliance (MoCA) network, and others. Multiple systems operator (MSO) or service provider devices and/or networks within the WAN 120 may be used to provide, manage, and/or troubleshoot the multiple services provided to subscribers.

In embodiments, the central device 110 may be located within a customer premise and may deliver one or more of the multiple services to client devices 105 through a local network 125. The local network 125 may include a local area network (LAN), wireless local area network (WLAN), personal area network (PAN), MoCA network, mobile hotspot network, and others. The central device 110 may facilitate and route communications between one or more client devices 105 and an upstream network (e.g., provider network 120, WAN 115, etc.). It should be understood that the central device 110 may be integrated with other devices. For example, a modem may reside within a gateway device, STB, or other device. It will be appreciated by those skilled in the relevant art that delivery of the multiple services over the local network 125 may be accomplished using a variety of standards and formats.

In embodiments, multimedia content may be delivered to the central device 110 as one or more transport streams carried by one or more downstream channels (e.g., broadcast or linear channel, multicast channel, unicast channel, high-speed data channel, VoD channel, etc.). The central device 110 may include multiple tuners, wherein each tuner may be configured to tune to and receive content or data carried by a downstream channel. The central device 110 may route content or data to a requesting client device 105 or store received content at local or external storage.

In embodiments, the central device 110 may convert or transcode received content. The central device 110 may convert or transcode content such that the transcoded or converted content is compatible with one or more specific client devices 105. For example, mobile devices or tablets may require content to be delivered in a different format or size than the format or size of the content as received by the central device 110. Transcoded or converted content may be streamed to a requesting client device 105 or may be stored at local or external storage for later delivery to a requesting client device 105.

Resources and bandwidth are consumed by a central device 110 when the central device 110 is processing real time operations and/or non-real time operations. Real time operations may include operations that require processing within a certain time constraint (e.g., for live streaming or immediate playback) or at a certain bitrate. For example, time or quality constraints may require that certain operations associated with the delivery of content to one or more client devices 105 are processed by the central device 110 at a certain bitrate, and may thereby require that a certain amount of bandwidth be allocated to the operation. Real time operations may include, but are not limited to, such operations as processing and delivery of content (e.g., linear television, VoD content, DVR content, streaming content, etc.) to a requesting client device 105, recording of content (e.g., recording linear content as the content is received at the central device 110), and others.

Non-real time operations may include operations that are not bound by a time constraint or that do not otherwise require immediate processing. Thus, a non-real time operation may not require processing at any certain bitrate and may be processed over a delayed or extended period of time. Non-real time operations may include, but are not limited to, media copy or synchronization operations (e.g., copying or synchronizing content received at or stored by the central device 110 to one or more client devices 105), transcoding operations (e.g., background transcoding operations or transcoding of locally stored content received by or stored at the central device 110 into one or more formats or resolutions that are compatible with requesting client devices 105), compression operations (e.g., compression of content at the central device 110 for delivery of the content to one or more client devices 105), and others. Non-real time transcoding operations may include transcoding operations applied to content stored at the central device 110, wherein the stored content is transcoded into a format or resolution compatible with a remote device (e.g., client device 105) through which the content might be requested at a later time.

In embodiments, the central device 110 may dynamically adjust the bandwidth that is allocated to a group of non-real time operations or individual non-real time operations. For example, when the central device 110 needs additional bandwidth to process real time operations and the processing of one or more non-real time operations may be delayed, the central device 110 may reduce the bandwidth allocated to non-real time operations and increase the bandwidth allocated to real time operations. It should be understood that the bandwidth allocation to non-real time operations may be adjusted periodically or upon the occurrence of a certain event or condition. As an example, the bandwidth allocated to non-real time operations may be adjusted each time a new real time or non-real time operation is requested from the central device 110. As another example, the bandwidth allocated to non-real time operations may be adjusted each time a significant change occurs in the resource load of the central device 110.

Figure 2:
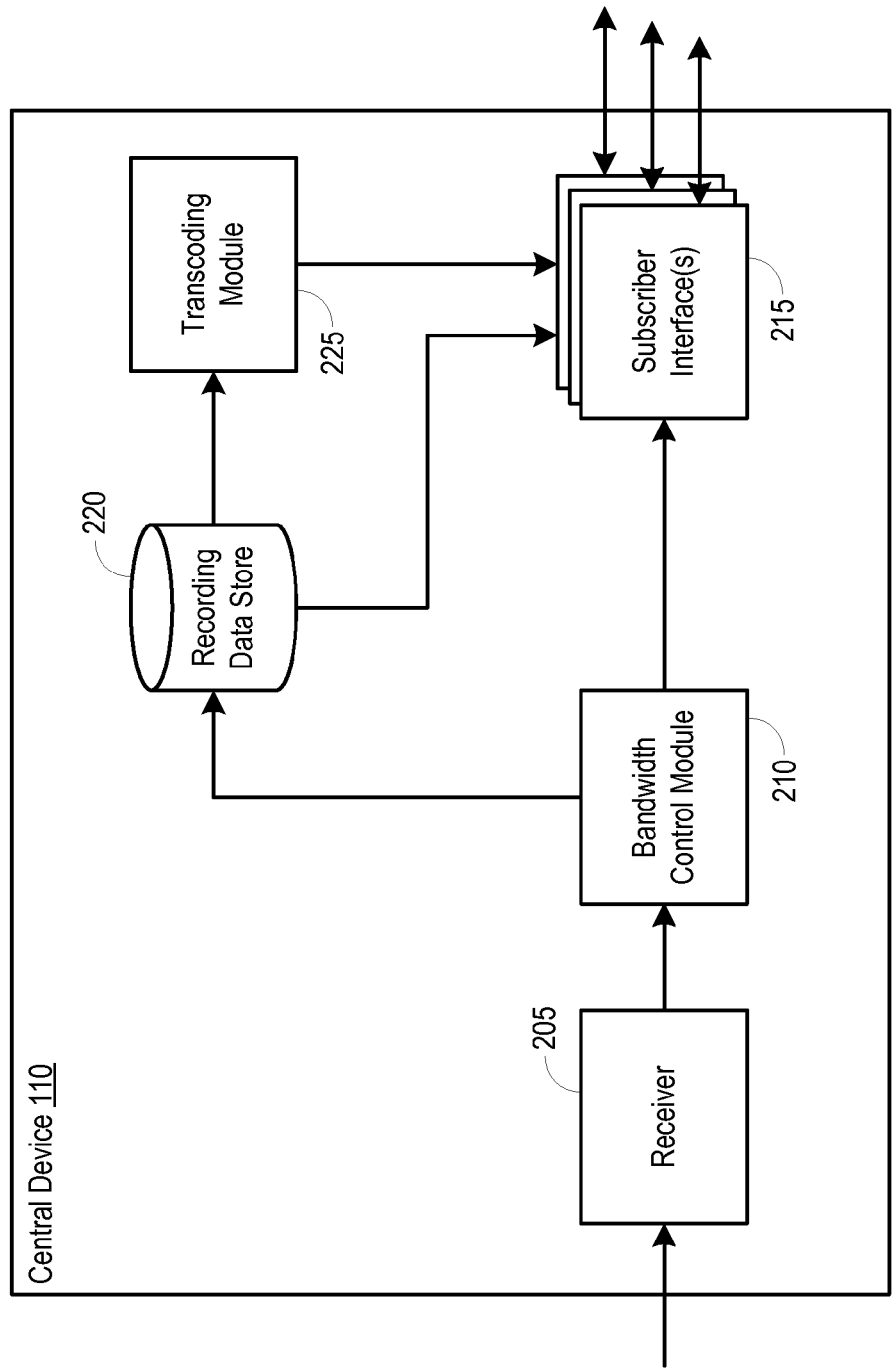
FIG. 2 is a block diagram illustrating an example central device operable to facilitate dynamic bandwidth allocation for non-real time operations.

FIG. 2 is a block diagram illustrating an example central device 110 operable to facilitate dynamic bandwidth allocation for non-real time operations. The central device 110 may include a receiver 205, a bandwidth control module 210, one or more subscriber interfaces 215, a recording data store 220, and a transcoding module 225. In embodiments, the central device 110 may receive content, data, and one or more other services through a receiver 205.

In embodiments, a bandwidth control module 210 may control bandwidth allocations to non-real time operations and real time operations. The bandwidth control module 210 may monitor the use of the central device 110 resources for processing non-real time operations and real time operations, and may prioritize the processing of real time operations over non-real time operations. For example, the bandwidth control module 210 may determine an allocation of bandwidth to the processing of non-real time operations based upon the bandwidth that is consumed by the processing of real time operations.

In embodiments, the bandwidth control module 210 may determine the bandwidth that is available to the central device 210 for processing all operations (e.g., real time operations and non-real time operations). The bandwidth control module 210 may determine the bandwidth that is currently being used by the central device 210 for the processing of real time operations and/or the bandwidth that is reserved for the processing of upcoming real time operations or real time operations that may be requested by one or more client devices 105. For example, real time bandwidth may be consumed by the output of content (e.g., linear television, VoD content, streaming content, etc.) to one or more client devices 105 through one or more subscriber interfaces 215. Real time bandwidth may be consumed by a recording operation wherein content received at the central device 110 is recorded in a recording data store 220.

In embodiments, the bandwidth control module 210 may control the allocation of bandwidth to recording operations. For example, the bandwidth control module 210 may allocate a portion or the entirety of available bandwidth that is not being used for the processing of real time operations to the recording of a complete piece of content (e.g., piece of content that is received or accessed as a complete media file). The recording may be a copy operation of a piece of content that is stored at the central device 110 (e.g., at the recording data store 220) or that is accessed from a remote device or storage.

In embodiments, the bandwidth control module 210 may control the allocation of bandwidth to media copying operations. Content that is recorded and stored at the recording data store 220 may be copied for later delivery to a client device 105. Content that is received and/or stored at the central device 110 may be copied or synchronized to a connected or associated client device 105, and the media copy operation may occur in real time or over an extended or delayed period of time. When the copy is not being requested for immediate delivery to a client device 105, the media copy operation may be carried out over an extended period of time. Thus, the bandwidth control module 210 may prioritize real time operations and/or other non-real time operations over the media copy operation, and may allocate bandwidth to the media copy operation as bandwidth becomes available to the central device 110.

In embodiments, the bandwidth control module 210 may control the allocation of bandwidth to transcoding operations. Content that is received at the central device 110 may be compressed or transcoded into one or more various formats or resolutions (e.g., high-definition, standard-definition, H.264, etc.). Content may be transcoded as the content is received at the central device 110 and the transcoded content may be stored at the recording data store 220, or content that is stored at the recording data store 220 may be transcoded prior to being output to one or more client devices 105. For example, content may be compressed according to constraints associated with a requesting client device 105, or the content may be transcoded such that the transcoded content is compatible with a requesting client device 105. Non-real time transcoding operations may be processed as background operations, thus, the bandwidth control module 210 may prioritize real time operations (e.g., transcoding operations being carried out on content during playback of the content) and/or other non-real time operations over a non-real time or background transcoding operation, and may allocate bandwidth to the non-real time or background transcoding operation as bandwidth becomes available to the central device 110.

In embodiments, allocation of bandwidth to non-real time operations may be based upon the bandwidth available to the central device 110 that is not being used for real time operations and the number of non-real time operations being processed by the central device 110. For example, the bandwidth allocated to or the bitrates at which each of the non-real time operations are processed may be uniform (e.g., each non-real time operation is processed at the same bitrate) or may be individually unique according to, for example, a level of priority given to each non-real time operation.

When a new real time operation or non-real time operation is requested from the central device 110, the bandwidth control module 210 may adjust the bandwidth allocated to non-real time operations to provide enough bandwidth for the central device 110 to process the new real time operation or non-real time operation. For example, when a new real time operation is requested from the central device 110, the bandwidth control module 210 may reduce the total amount of bandwidth allocated to non-real time operations such that the new real time operation may be processed at a required bitrate. When a new non-real time operation is requested from the central device 110, the bandwidth control module 210 may maintain the total amount of bandwidth allocated to non-real time operations and may reduce the bandwidth allocated to one or more individual non-real time operations to provide enough bandwidth for processing the requested non-real time operation.

Figure 3:
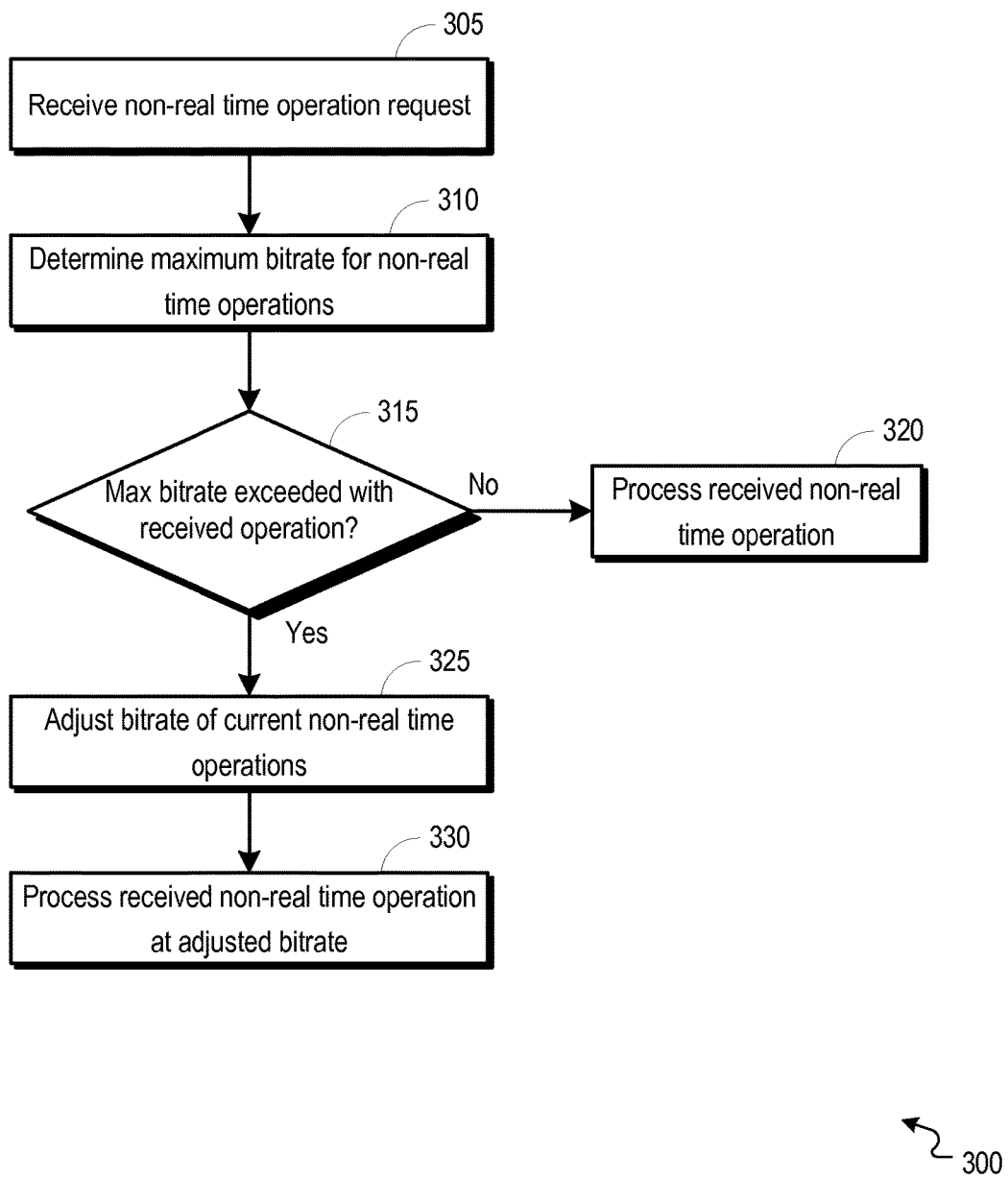
FIG. 3 is a flowchart illustrating an example process operable to facilitate bitrate adjustment of non-real time operations.

FIG. 3 is a flowchart illustrating an example process 300 operable to facilitate bitrate adjustment of non-real time operations. The process 300 can begin at 305, when a non-real time operation request is received. The non-real time operation request may be received at a central device 110 of FIG. 1. The requested non-real time operation may be a media copy operation, a non-real time transcoding operation, or other non-real time operation. It should be understood that the process 300 may begin at 305 when a real-time operation request is received at a central device 110.

At 310, a maximum bitrate for non-real time operations may be determined. The maximum bitrate for non-real time operations may be determined, for example, by the central device 110 (e.g., at a bandwidth control module 210 of FIG. 2). In embodiments, the maximum bitrate for non-real time operations may be an amount of bandwidth allocated to the processing of non-real time operations and may be based upon the bandwidth available to the central device 110, the bandwidth used by the central device 110 for completing real time operations, and any bandwidth reserved by the central device 110 for completing real time operations. Real time operations may be prioritized such that bandwidth is allocated to processing real time operations before non-real time operations. For example, the maximum bitrate for non-real time operations may be the bandwidth available to the central device 110 that is not being used by or is not otherwise reserved for the processing of real time operations.

At 315, the determination is made whether the requested non-real time operation will cause the maximum bitrate for non-real time operations to be exceeded. The determination whether the requested non-real time operation will cause the maximum bitrate for non-real time operations to be exceeded may be made, for example, by the central device 110 (e.g., at a bandwidth control module 210 of FIG. 2). If the requested non-real time operation will not cause the maximum bitrate for non-real time operations to be exceeded, the determination may be made that the central device 110 has enough available bandwidth to process the non-real time operation without interfering with real time operations, and the requested non-real time operation may be processed at 320. At 320, the requested non-real time operation may be processed at a maximum bitrate that is used for processing non-real time operations when bandwidth is available at the central device 110.

If, at 315, the requested non-real time operation will cause the maximum bitrate for non-real time operations to be exceeded, the determination may be made that the central device 110 does not have enough available bandwidth to process the non-real time operation without interfering with real time operations, and the process 300 can proceed to 325. At 325, the bitrate at which current non-real time operations are processed may be adjusted. The bitrate at which current non-real time operations are processed may be adjusted, for example, by the central device 110 (e.g., at a bandwidth control module 210 of FIG. 2).

In embodiments, the bitrate at which one or more current non-real time operations are processed by the central device 110 can be reduced such that the central device 110 has enough bandwidth available to process the real time operations. The bitrates at which each of the non-real time operations are processed may be adjusted uniformly (e.g., each non-real time operation is processed at the same bitrate) or individually according to, for example, a level of priority given to each non-real time operation. For example, non-real time operations may be distinguished and prioritized from each other based on type of non-real time operation (e.g., media copy operation, non-real time transcoding operation, etc.), size of non-real time operation, client device or user requesting the non-real time operation, and other factors. In embodiments, the bitrate at which one or more current non-real time operations are processed may be reduced by a predetermined amount. For example, the predetermined amount by which a bitrate associated with a non-real time operation is reduced may be based upon a percentage of the current bitrate associated with the non-real time operation, historical or empirical bitrates associated with the non-real time operation, a priority level associated with the type of non-real time operation or a user/subscriber requesting the non-real time operation, and others. It should be understood that various algorithms may be used for adjusting the bitrate of current non-real time operations to create enough bandwidth for the processing of current real time operations. It should be further understood that the bitrate at which non-real time operations are processed may be adjusted upon the reception of a non-real time operation request or the reception of a real-time operation request.

At 330, the requested non-real time operation may be processed at the adjusted bitrate. The requested non-real time operation may be processed at a bitrate that is uniform for each non-real time operation currently being processed at the central device 110, or at a bitrate that is unique to the requested non-real time operation based upon a priority level associated with the operation.

Figure 4:
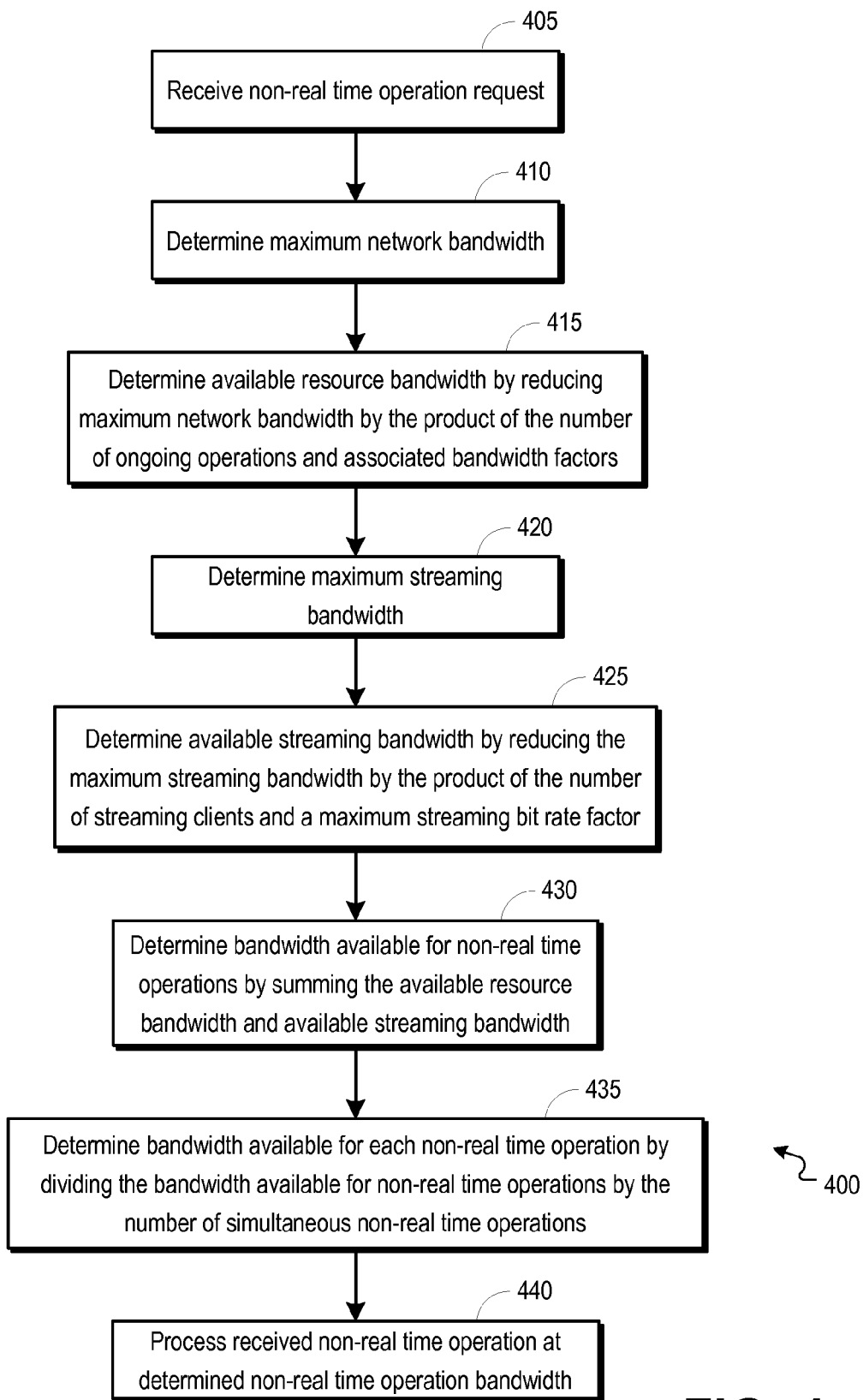
FIG. 4 is a flowchart illustrating an example process operable to facilitate the determination of a bandwidth allocation for processing a non-real time operation.

FIG. 4 is a flowchart illustrating an example process 400 operable to facilitate dynamic bandwidth allocation for processing a non-real time operation. The process 400 can begin at 405, when a non-real time operation request is received. The non-real time operation request may be received at a central device 110 of FIG. 1. The requested non-real time operation may be a media copy operation, a non-real time transcoding operation, or other non-real time operation. It should be understood that the process 400 may begin at 405 when a real-time operation request is received.

At 410, a maximum network bandwidth for resources of the central device 110 may be determined. The maximum network bandwidth may be determined, for example, by the central device 110 (e.g., at a bandwidth control module 210 of FIG. 2). The maximum network bandwidth may be a measure of the maximum bandwidth capacity for the local resources of the central device 110.

At 415, available resource bandwidth at the central device 110 may be determined by reducing the maximum network bandwidth by the sum of the products of operations and associated bandwidth factors. The available resource bandwidth may be determined, for example, by the central device 110 (e.g., at a bandwidth control module 210 of FIG. 2). Bandwidth factors may be a measure of an estimated or average bandwidth consumed by the processing of an associated operation. In embodiments, each of a plurality of operation types (e.g., local playback, media copy or recording operations, real-time or non-real time transcoding operations, etc.) may be associated with a bandwidth factor, wherein the bandwidth factor is a measure of the estimated or average bandwidth consumed by the processing of the associated operation. For example, the available resource bandwidth may be determined by reducing the maximum network bandwidth by the sum of the product of the number of current recording operations being processed at the central device 110 and a bandwidth factor associated with recording operations, the product of the number of current local content playbacks being processed by the central device 110 and a bandwidth factor associated with playback operations, and the product of the number of current transcoding operations being processed by the central device 110 and a bandwidth factor associated with transcoding operations. It should be understood that the bandwidth factors may be adjusted according to the level of activity taking place at the central device 110. For example, the bandwidth factor associated with an operation may be increased or decreased with a change in the bandwidth available at the central device 110 and/or with a change in the number of operations being processed at the central device 110.

At 420, the maximum streaming bandwidth of the central device 110 may be determined. The maximum streaming bandwidth may be determined, for example, by the central device 110 (e.g., at a bandwidth control module 210 of FIG. 2). The maximum streaming bandwidth may provide a metric of the maximum bandwidth that might be required for streaming content to one or more client devices (e.g., client devices 105 of FIG. 1), wherein the maximum streaming bandwidth is based upon the maximum number of clients that can receive content from the central device 110. For example, the maximum number of clients that can receive content from the central device 110 at a given time may be based upon resource constraints or settings associated with the central device 110. In embodiments, the maximum streaming bandwidth may be the product of the maximum number of streaming client devices and a measure of the estimate, average, or maximum bitrate at which content may be streamed to an individual client device.

At 425, available streaming bandwidth may be determined by reducing the maximum streaming bandwidth by the product of the number of client devices currently streaming content from the central device 110 and a maximum streaming bit rate factor. The available streaming bandwidth may be determined, for example, by the central device 110 (e.g., at a bandwidth control module 210 of FIG. 2). The available streaming bandwidth may provide a measure of the bandwidth allocated to streaming content to client devices that is not currently being used to stream content to client devices. In embodiments, the maximum streaming bitrate factor may be the maximum bitrate that may be required for streaming content to an individual client device. It should be understood that the maximum streaming bitrate may vary based on the type of client devices streaming content from the central device 110 and/or the type or quality of content that is streamed to one or more client devices.

At 430, the bandwidth available for processing of non-real time operations may be determined by summing the available resource bandwidth and available streaming bandwidth. The bandwidth available for processing of non-real time operations may be determined, for example, by the central device 110 (e.g., at a bandwidth control module 210 of FIG. 2). The bandwidth available for processing of non-real time operations may provide a measure of the bandwidth that is available to the central device 110 and is not being used or reserved for processing real time operations.

At 435, the bandwidth available for the processing of each individual non-real time operation may be determined by dividing the bandwidth available for non-real time operations by the number of non-real time operations currently being processed by or requested of the central device 110. The bandwidth available for processing of each non-real time operation may be determined, for example, by the central device 110 (e.g., at a bandwidth control module 210 of FIG. 2). The bandwidth available for the processing of each individual non-real time operation may provide a measure of the average bandwidth that may be allocated to the processing of each individual non-real time operation that is currently being processed by or requested of the central device 110. It should be understood that the actual bitrate at which each individual non-real time operation is processed may vary. For example, a non-real time operation that was being processed prior to the most recent non-real time operation request being received may continue being processed at the previously applied bitrate. As another example, the central device 110 may allocate bandwidth available for non-real time operations amongst the individual non-real time operations according to a priority level given to each non-real time operation (e.g., priority based on type of operation, size of operation, requesting client or device, etc.).

At 440, the requested non-real time operation may be processed at a bitrate that is equivalent to or less than the bandwidth that is determined to be available for each individual non-real time operation. The requested non-real time operation may be processed at a bitrate that is uniform for each non-real time operation currently being processed at the central device 110, or at a bitrate that is unique to the requested non-real time operation based upon a priority level associated with the operation.

As an example of the bandwidth determination described by FIG. 4, the following Equation 1 may be used to determine the bandwidth allocated for a non-real time operation:

$$BWop = \frac{BWres + BWstr}{NRTops} \qquad \text{Equation 1}$$

According to Equation 1, BWop is the bandwidth allocated for use in processing each individual non-real time operation at a central device 110 of FIG. 1, BWres is a measure of the local resource bandwidth at the central device 110 that is not currently being consumed by the processing of real-time or non-real time operations (e.g., local resource bandwidth that may be allocated to non-real time operations), BWstr is the streaming bandwidth at the central device 110 that is not currently being consumed by the processing of real-time operations or non-real time operations (e.g., streaming bandwidth that may be allocated to non-real time operations), and NRTops is the number of non-real time operations that are currently being processed by the central device 110.

The following Equation 2 may be used to calculate the resource bandwidth at the central device 110 that may be allocated to the processing of non-real time operations (BWres):

$$BWres = BWlocmax - \sum_{i=1}^{n} OPS_i * BWfac_i \qquad \text{Equation 2}$$

According to Equation 2, BWlocmax is the maximum bandwidth for local resources of the central device 110, $OPS_i$ is the number of operations of type i that are currently being processed by the central device 110, and $BWfac_i$ is a bandwidth factor associated with the operation of type i. It should be understood that the operations being processed at a central device 110 may be characterized into various types or categories (e.g., local playbacks, recording or copying operations, non-real time transcoding operations, etc.), and that each type or category of operation may be associated with a unique bandwidth factor, the bandwidth factor being a measure of an average, an estimate, or a maximum bandwidth that is used by the central device 110 in the processing of the non-real time operation. Moreover, the bandwidth factor may be based upon the maximum local bandwidth (e.g., BWlocmax) associated with the central device 110 and may be further based on the number of operations and the type of operations being processed by the central device 110. For example, the bandwidth factor for a particular operation type may be increased or decreased with a change in the number of operations being processed by the central device 110.

The following Equation 3 may be used to calculate the streaming bandwidth at the central device 110 that may be allocated to the processing of non-real time operations (BWstr):

$$BWstr = BRstrmax(CLmax - CLcurr) \qquad \text{Equation 3}$$

According to Equation 3, BRstrmax is a maximum streaming bitrate factor, CLmax is the maximum number of client devices that may stream content from a central device 110, and CLcurr is the number of client devices currently streaming content from the central device 110. The maximum streaming bitrate factor may be a measure of the maximum bitrate at which content may be streamed from the central device 110 to one or more client devices (e.g., client devices 105 of FIG. 1), and the maximum streaming bitrate factor may vary according to the types of client devices streaming content from the central device 110 and/or the types of content (e.g., size, quality of content, etc.) being streamed to the client devices.

Figure 5:
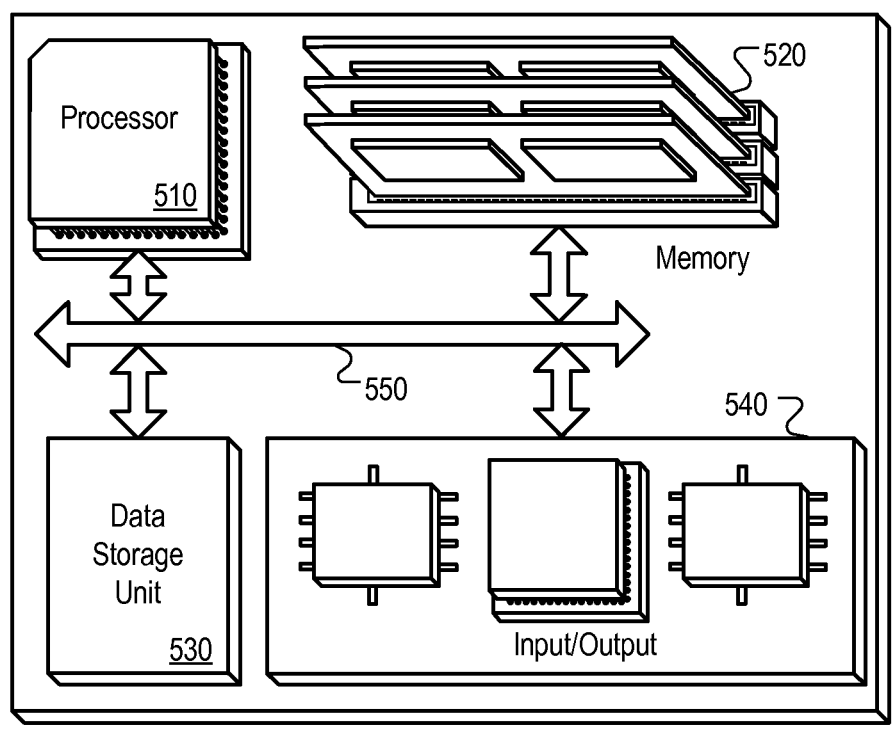
FIG. 5 is a block diagram of a hardware configuration operable to facilitate dynamic bandwidth allocation for non-real time operations.

FIG. 5 is a block diagram of a hardware configuration 500 operable to facilitate dynamic bandwidth allocation for non-real time operations. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g, television, STB, computer, mobile device, tablet, etc.) or display device associated with a client device 105. In another implementation, the input/output device can include driver devices configured to send communications to, and receive communications from one or more networks (e.g., WAN 115 of FIG. 1, provider network 120 of FIG. 1, local network 125 of FIG. 1, etc.).

Those skilled in the art will appreciate that the invention improves upon methods and systems for allocating bandwidth amongst operations processed at a device. Methods, systems, and computer readable media can be operable to facilitate dynamic bandwidth allocation for non-real time operations. The processing of real time operations may be prioritized over the processing of non-real time operations by reducing the amount of device resources and bandwidth that are allocated to non-real time operations. A maximum bandwidth for non-real time operations may be determined and dynamically adjusted, wherein the maximum bandwidth is based upon the bandwidth available to a device that is not being used for the processing of real time operations. Bitrates at which non-real time operations are processed may be dynamically adjusted such that the maximum bandwidth is not exceeded by the processing of the non-real time operations.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   recognizing a change in a resource load associated with a central device configured to retrieve and deliver multimedia content to one or more client devices;
   determining a maximum bandwidth allocation for processing non-real time operations, wherein the maximum bandwidth allocation for processing non-real time operations is based upon a maximum bandwidth available to the central device and the amount of bandwidth required for real time operations being processed at the central device;
   managing the processing of one or more non-real time operations such that the processing of the one or more non-real time operations conforms with the maximum bandwidth allocation for processing non-real time operations;

determining a uniform bandwidth allocation for each respective one of the one or more non-real time operations by dividing the maximum bandwidth allocation for processing non-real time operations by the number of non-real time operations being processed at the central device; and adjusting the bitrate at which each respective one of the one or more non-real time operations is processed such that the bandwidth consumed by the processing of the respective non-real time operation is less than the uniform bandwidth allocation.

2. The method of claim 1, wherein recognizing the change in the resource load associated with the central device comprises:

identifying a request for a real time operation to be processed by the central device.

3. The method of claim 1, wherein recognizing the change in the resource load associated with the central device comprises:

identifying a request for a non-real time operation to be processed by the central device.

4. The method of claim 1, wherein determining the maximum bandwidth allocation for processing non-real time operations comprises:

reducing the maximum bandwidth available to the central device by the sum of the amount of bandwidth required by the real time operations being processed at the central device, and an amount of bandwidth that is reserved for processing forthcoming real time operations.

5. The method of claim 1, further comprising:

determining a unique bandwidth allocation for each respective one of the one or more non-real time operations, wherein the unique bandwidth allocated to each respective one of the one or more non-real time operations is based upon a priority level associated with the respective non-real time operation; and adjusting the bitrate at which each respective one of the one or more non-real time operations is processed such that the bandwidth consumed by the processing of the respective non-real time operation is less than the unique bandwidth allocation for the respective non-real time operation.

6. The method of claim 1, wherein managing the processing of one or more non-real time operations comprises:

adjusting the processing of the one or more non-real time operations such that the bandwidth consumed by the processing of the one or more non-real time operations is reduced by a predetermined amount.

7. The method of claim 1, wherein the central device comprises a customer premise equipment device.

8. The method of claim 1, wherein one or more of the non-real time operations comprise copy operations.

9. A central device configured to retrieve and deliver multimedia content to one or more client devices, wherein the central device processes real time operations and non-real time operations, the central device comprising:

one or more subscriber interfaces that deliver multimedia content to the one or more client devices;

a transcoding module that performs one or more non-real time operations; and one or more modules that:

recognize a change in a resource load;

determine a maximum bandwidth allocation for processing non-real time operations, wherein the maximum bandwidth allocation for processing non-real time operations is based upon a maximum bandwidth for processing real time operations and non-real time operations and the amount of bandwidth required for real time operations being processed; and adjust the processing of one or more non-real time operations such that the bandwidth consumed by the processing of the one or more non-real time operations is less than the maximum bandwidth allocation for processing non-real time operations;

determine a uniform bandwidth allocation for each respective one of the one or more non-real time operations by dividing the maximum bandwidth allocation for processing non-real time operations by the number of non-real time operations being processed; and adjust the bitrate at which each respective one of the one or more non-real time operations is processed such that the bandwidth consumed by the processing of the respective non-real time operation is less than the uniform bandwidth allocation.

10. The central device of claim 9, wherein the one or more subscriber interfaces further:

receive a request for the processing of a real time operation or a non-real time operation;

wherein the one or more modules recognize the change in the resource load based upon the reception of the request for the processing of the real time operation or the non-real time operation.

11. The central device of claim 9, wherein determining the maximum bandwidth allocation for processing non-real time operations comprises:

reducing the maximum bandwidth for processing real time operations and non-real time operations by the sum of the amount of bandwidth required by the real time operations being processed, and an amount of bandwidth that is reserved for processing forthcoming real time operations.

12. The central device of claim 9, wherein the one or more modules further:

determine a unique bandwidth allocation for each respective one of the one or more non-real time operations, wherein the unique bandwidth allocated to each respective one of the one or more non-real time operations is based upon a priority level associated with the respective non-real time operation; and adjust the bitrate at which each respective one of the one or more non-real time operations is processed such that the bandwidth consumed by the processing of the respective non-real time operation is less than the unique bandwidth allocation for the respective non-real time operation.

13. One or more non-transitory computer readable media having instructions operable to cause one or more processors to perform the operations comprising:

recognizing a change in a resource load associated with a central device configured to retrieve and deliver multimedia content to one or more client devices;

determining a maximum bandwidth allocation for processing non-real time operations, wherein the maximum bandwidth allocation for processing non-real time operations is based upon a maximum bandwidth available to the central device and the amount of bandwidth required for real time operations being processed at the central device;

adjusting the processing of one or more non-real time operations such that the bandwidth consumed by the processing of the one or more non-real time operations is less than the maximum bandwidth allocation for processing non-real time operations;

determining a uniform bandwidth allocation for each respective one of the one or more non-real time operations by dividing the maximum bandwidth allocation for processing non-real time operations by the number of non-real time operations being processed at the central device; and adjusting the bitrate at which each respective one of the one or more non-real time operations is processed such that the bandwidth consumed by the processing of the respective non-real time operation is less than the uniform bandwidth allocation.

14. The one or more non-transitory computer-readable media of claim 13, wherein recognizing the change in the resource load associated with the central device comprises:
identifying a request for a real time operation to be processed by the central device.

15. The one or more non-transitory computer-readable media of claim 13, wherein recognizing the change in the resource load associated with the central device comprises:
identifying a request for a non-real time operation to be processed by the central device.

16. The one or more non-transitory computer-readable media of claim 13, wherein determining the maximum bandwidth allocation for processing non-real time operations comprises:
reducing the maximum bandwidth available to the central device by the sum of the amount of bandwidth required by the real time operations being processed at the central device, and an amount of bandwidth that is reserved for processing forthcoming real time operations.

17. The one or more non-transitory computer-readable media of claim 13, wherein the instructions are further operable to cause one or more processors to perform the operations comprising:
determining a unique bandwidth allocation for each respective one of the one or more non-real time operations, wherein the unique bandwidth allocated to each respective one of the one or more non-real time operations is based upon a priority level associated with the respective non-real time operation; and adjusting the bitrate at which each respective one of the one or more non-real time operations is processed such that the bandwidth consumed by the processing of the respective non-real time operation is less than the unique bandwidth allocation for the respective non-real time operation.

* * * * *